United States Patent [19]

Yu et al.

[11] Patent Number: 5,565,281
[45] Date of Patent: Oct. 15, 1996

[54] SHUTDOWN, BILAYER BATTERY SEPARATOR

[75] Inventors: Wei-Ching Yu; Margaret W. Geiger, both of Charlotte, N.C.

[73] Assignee: Hoechst Celanese Corporation, Somerville, N.J.

[21] Appl. No.: 348,630

[22] Filed: Dec. 2, 1994

[51] Int. Cl.$^6$ .................................................... H01M 2/18
[52] U.S. Cl. ............................................ 429/62; 429/145
[58] Field of Search ........................... 429/62, 144, 145, 429/254; 204/252, 296; 428/316.6, 421, 422, 913

[56] References Cited

U.S. PATENT DOCUMENTS

| | | | |
|---|---|---|---|
| 3,426,754 | 2/1969 | Bierenbaum et al. | 128/156 |
| 3,558,764 | 1/1971 | Isaacson et al. | 264/210 |
| 3,679,538 | 7/1972 | Druin et al. | 161/159 |
| 3,801,404 | 4/1974 | Druin et al. | 156/229 |
| 3,801,692 | 4/1974 | Zimmerman | 264/210 |
| 3,843,761 | 10/1974 | Bierenbaum et al. | 264/210 |
| 3,853,601 | 12/1974 | Taskier | 117/98 |
| 4,138,459 | 2/1979 | Brazinsky et al. | 264/154 |
| 4,539,256 | 9/1985 | Shipman | 428/315.5 |
| 4,650,730 | 3/1987 | Lundquist et al. | 429/62 |
| 4,726,989 | 2/1988 | Mrozinski | 428/315.5 |
| 4,731,304 | 3/1988 | Lundquist et al. | 429/62 |
| 4,994,335 | 2/1991 | Kamei et al. | 429/254 |
| 5,240,655 | 8/1993 | Troffkin et al. | 264/28 |
| 5,281,491 | 1/1994 | Rein et al. | 429/62 |
| 5,385,777 | 1/1995 | Higuchi et al. | 429/254 X |
| 5,389,433 | 2/1995 | Chang et al. | 429/145 X |
| 5,409,588 | 4/1995 | Mushiake et al. | 429/144 X |

FOREIGN PATENT DOCUMENTS

| | | |
|---|---|---|
| 0577387A1 | 1/1994 | European Pat. Off. . |
| 55-105968 | 11/1981 | Japan . |
| 57-095070 | 6/1982 | Japan . |
| 57-172657 | 10/1982 | Japan . |
| 06020671 | 11/1986 | Japan . |
| 6-20671 | 1/1994 | Japan . |

*Primary Examiner*—Anthony Skapars
*Attorney, Agent, or Firm*—R. H. Hammer, III

[57] ABSTRACT

The present invention is directed to a shutdown, bilayer battery separator and a process for making the same. A first microporous membrane with shutdown capability and a second microporous membrane with strength capability are joined together in face-to-face contact. The face of the first membrane being adhered by calendaring, adhesives, or welding, to the face of the second membrane, and the separator having a thickness of less than 3 mils, and a puncture strength, as measured from the second microporous membrane, of greater than 1900 g-mm, and a peel strength of greater than 1 grams/centimeter.

11 Claims, No Drawings

SHUTDOWN, BILAYER BATTERY SEPARATOR

FIELD OF THE INVENTION

The present invention is directed to a shutdown, bilayer battery separator.

BACKGROUND OF THE INVENTION

Shutdown, bilayer battery separators are known. For example, see U.S. Pat. Nos. 4,650,730; 4,731,304; 5,240,655; 5,281,491; and Japanese Kokai No. 6-20671, each of the foregoing is incorporated herein by reference.

In batteries, the anode and cathode are separated from one another by a separator. Today, "lithium batteries" are very popular because they are able to generate high energy outputs. The lithium battery market can be divided into two groups, the "primary" lithium battery and the "secondary" lithium battery. The primary lithium battery is a disposable battery, while the secondary lithium battery, is a rechargeable battery. A problem associated with the secondary lithium battery is its potential for short circuiting. Short circuiting arises when the separator ruptures and allows the anode and the cathode to come into direct electrical communication with one another. This short circuit may manifest itself with a rapid evolution of heat. This rapid evolution of heat can cause the battery to explode. Accordingly, the shutdown battery separator was developed.

The shutdown battery separator generally comprises two polymerically dissimilar and juxtaposed microporous membranes. One microporous membrane is chosen for its relatively low melting point and the other for its relative strength. For example, the low melting point membrane may be a polyethylene material and the strength membrane may be a polypropylene material. The polyethylene microporous membrane has a melting point of about 130° C. This is sufficiently low that, in the event of a short circuit in a lithium battery, the heat generated will melt the polyethylene so that it shuts down, or fills in the pores of the separator, and thereby stops or inhibits the likelihood of a short circuit. The polypropylene membrane, which has a substantially higher melting point, approximately 160° C., provides strength to the separator so that it maintains the separator's integrity in the event of a short circuit.

In U.S. Pat. No. 4,650,730 and 4,731,304, shutdown, bilayer battery separators of the foregoing type are disclosed. In the examples, separator thicknesses of 3–4 mils are disclosed. The methods of making these battery separators are disclosed as: 1) two discrete films containing extractable fillers are made, then bonded together, and then the fillers are extracted; 2) a bilayer film, containing extractable fillers, is coextruded and the fillers are subsequently extracted; 3) one film made by an extrusion, annealing and stretching process, and a second film made with extractable fillers are bonded together, and then the fillers are subsequently extracted; 4) a first film is coated with a second material. In U.S. Pat. No. 5,240,655, a shutdown, bilayer battery separator, of the above-mentioned type, is made by coextruding the discrete layers, and then stretching and annealing the extruded bilayer film. In U.S. Pat. No. 5,281,491, the shutdown, bilayer battery separator, of the above-mentioned type, is made by coextruding the first and second films that contain an extractable material, and the extractable material is subsequently removed.

In Japanese Kokai 6-20671, a shutdown, bilayer battery separator, of the above-mentioned type, has a thickness of about 1 to 2 mils, a penetration energy (from FIG. 1) of about 1660 g-mm (this value is equivalent to about 1800 g-mm when converted into units comparable with the test method disclosed herein), and a peel strength of 0.1 to 1 gram/centimeter. The separator is made by a process in which two discrete films, made by the process set forth in U.S. Pat. Nos. 3,679,538 or 3,801,404, are bonded together by calendaring at a temperature of 134° C.

A problem with the foregoing battery separators is that, while they provide the necessary shutdown characteristics, they are deficient in one or more of the following qualities: thinness or penetration energy for puncture strength) or peel strength. In the manufacture of batteries, it is important to have extremely thin separators, so that: the energy density of the battery maybe increased; and the size of the battery, as well as, the electrical resistance across the separator, may be reduced. Good penetration energy is important in battery manufacture, particularly in the manufacture of "jelly roll" type batteries because the surfaces of the anode and the cathode can be sufficiently rough that they can puncture these extremely thin separators during manufacture. Good peel strength is important in battery manufacture because it prevents delamination of the separator. Accordingly, there is a need to produce an extremely thin, shutdown battery separator that has a sufficient penetration energy and peel strength to withstand the rigors of battery manufacture.

SUMMARY OF THE INVENTION

The present invention is directed to a shutdown, bilayer battery separator. A first microporous membrane with shutdown capability and a second microporous membrane with strength capability are joined together in face-to-face contact. The face of the first membrane being adhered by calendaring, adhesives, or welding, to the face of the second membrane, and the separator having a thickness of less than 3 mils, and a puncture strength, as measured from the second microporous membrane, of greater than 1900 g-mm, and a peel strength of greater than 1 grams/centimeter.

Additionally, the present invention is directed to a process for making a shutdown, bilayer battery separator comprising the steps of:

1) forming a first microporous membrane by
   a) extruding a first polymer to form a first sheet,
   b) annealing the first sheet,
   c) stretching the first sheet;
2) forming a second microporous membrane by
   a) extruding a second polymer to form a second sheet,
   b) annealing the second sheet,
   c) stretching the second sheet; and
3) bonding the first membrane in face-to-face contact with the second membrane by a method comprising calendaring at a temperature less than 134° C., adhering with adhesives, and welding.

DESCRIPTION OF THE INVENTION

The present invention shall be described in further detail below by way of the following detailed description and the non-limiting examples.

Shutdown battery separator, as used herein, refers to the type of separator described in U.S. Pat. Nos. 4,640,730; 4,731,304; 5,240,655; 5,281,491; Japanese Kokai No. 6-20671; and U.S. patent application Ser. No. 08/341,239, filed Nov. 17, 1994. now abandoned, and entitled "Methods of Making Cross-ply Microporous Membrane Battery Separators, and the Battery Separators Made Thereby", each of which is incorporated herein by reference.

These battery separators are preferably bilayer, i.e., have two different layers, one that provides the shutdown characteristics and the other that provides the strength characteristics. These separators, however, are not so limited and they may have more than two layers. Since the bilayer separator is preferred, it shall be discussed hereinafter.

These separators are made with at least two layers, one being a microporous membrane having shutdown capabilities and the other being a microporous membrane having strength capabilities. The shutdown capabilities refer to the principal, but not necessarily the sole, function of the layer which is the ability to close the micropores of the separator in the event of a short circuit. This typically means that the shutdown layer will melt, at some temperature, blind the pores of the separator, and thereby terminate the short circuit by prohibiting ion migration across the separator. Preferably, in lithium batteries, the shutdown capabilities can be provided by a material that will melt at a temperature at least 20° C. below the melting temperature of the lowest melting electrode (e.g., the lithium material, the melting point of lithium is about 180° C.). An example of such a material is polyethylene or a blend comprising substantially polyethylene, or a copolymer of polyethylene. The strength capabilities refer to the principal, but not necessarily the sole, function of the layer which is the ability to maintain the integrity of the separator in the event of a short circuit, as well as, to facilitate the manufacture of the battery. Preferably, in lithium batteries, the strength capabilities can be provided by a material that will melt at a temperature at about or greater than the melting temperature of the lowest melting electrode (e.g., the lithium material). An example of such a material is polypropylene or a blend comprising substantially polypropylene, or a copolymer of polypropylene.

The thickness of these separators is less than 3 mils (about 75 microns). These separators preferably range in thickness from about 0.9 mils (about 22 microns) to less than 3 mils (about 75 microns). Measurement details are set forth below.

The puncture strength (penetration energy) should be greater than 1900 grams-millimeters, when measured from the strength enabling side of the separator. Preferably, the puncture strength should be greater than 2000 gram-millimeters and, most preferably, the puncture strength should be greater than 2400 grams-millimeters. Measurement details are set forth below. The strength enabling side of a shutdown, bilayer battery separator made of a polyethylene layer and a polypropylene layer is the polypropylene side.

The peel strength should be greater than 1 gram/centimeter. Preferably, the peel strength should be greater than or equal to 4 grams/centimeters and, most preferably, the peel strength should be greater than or equal to 8 grams/centimeter. Measurement details are set forth below.

The process, by which the inventive separators are made, broadly comprises making a first microporous membrane, making a second microporous membrane, and bonding together the first membrane and the second membrane. Regarding the preferred method for making the first and the second membranes, the process requires the following steps: extruding a polymer to form a sheet; annealing the sheet; and stretching the annealed sheet. The specific methods for making these sheets, particularly polyethylene or polypropylene, are within the skill of the art. By way of non-limiting example, the following references, each of which is incorporated herein by reference, illustrate possible routes for making the sheets: U.S. Pat. Nos: 3,426,754; 3,558,764; 3,679,538; 3,801,404; 3,801,692; 3,843,761; 3,853,601; 4,138,459; 4,539,256; 4,726,989; 4,994,335; and U.S. patent application Ser. No. 08/341,239, filed Nov. 17, 1994. Further specifics regarding the preferred method fir making these sheets may be found in the non-limiting examples below.

The first and second membranes are preferrably oriented, with respect to one another in the same direction. Crossplying, as set forth in U.S. application Ser. No. 08/341,239, incorporated by reference, is also contemplated.

Regarding the preferred methods for bonding the first membrane to the second membrane, several bonding methods are contemplated. Broadly, the bonding methods include calendaring at a temperature less than 134° C., adhering with adhesives, and welding. Preferably, bonding is accomplished by calendaring, with nips closed, at a temperature of about 130° C. (a peel strength of greater than 1 gram/centimeter is thereby obtained). The application of adhesives may include: air atomizing; gravure/screen printing; hydraulic spraying; and ultrasonic spraying. The choice of adhesive and the rate of adhesive application must be chosen so that the separator's porosity is not adversely effected. The welding technique includes thermal welding and ultrasonic welding. The amount of energy for either welding procedure and the pattern of welds should be chosen so that the separator's porosity is not adversely effected.

Further information about the foregoing inventions may be obtained from the following non-limiting examples. The test methods referenced to herein are set forth below.

| Test Methods | |
|---|---|
| Gurley | ASTM-D726(B) Gurley is a resistance to air flow measured by the Gurley densometer (e.g. Model 4120). Gurley is the time in seconds required to pass 10 cc of air through one square inch of product under a pressure of 12.2 inches of water. |
| Basis Weight | Basis weight is determined by cutting three - one square foot samples across the width of the sample and weighing them on a precision balance with accuracy to 0.0001 grams. The three (3) samples are averaged and compared to tolerance limits. |
| Thickness | Method: T411om-83 developed under the auspices of the Technical Association of the Pulp and Paper Industry. Thickness is determined using a precision micrometer with a ½inch diameter, circular shoe contacting the sample at seven (7) PSI. Ten (10) individual micrometer readings taken across the width of the sample are averaged. |
| Shrinkage, MD | ASTM D-1204 (60 min. @ 90° C.) Three (e) separate lengths of stretched product of approximately ten centimeters are measured across the width of the sample in the machine direction (MD). The sample is exposed to air at 90° C. for one hour, the lengths are re-measured, the percentage shrinkage of the original length is calculated for each sample, and the results averaged. |
| Tensile Strength | ASTM D-882 |
| Puncture Strength | Ten measurements are made across the width of the stretched product and averaged. A Mitech Stevens LFRA Texture Analyzer is used. The needle is 1.65 mm in diameter with 0.5 mm radius. The rate of descent is 2 mm/sec and the amount of deflection is 6 mm. The film is held tight in the clamping device with a central hole of 11.3 mm. The displacement (in mm) of the film that was pierced by the needle was recorded against the resistance force (in gram force) developed by the film. The |

-continued

Test Methods

| | |
|---|---|
| | penetration energy (puncture strength) was defined as the product of the resistance force and the displacement at the maximum point. |
| Peel Strength | Peel strength is measured using a tension and compression tester to determine the force in grams required to separate two one-inch wide sections of bonded membrane. The peel rate is 6 inches/minute. Three measurements are taken across the web and averaged. |
| Melt Index | ASTM D 1238, (P); PP: 230° C., 2.16 Kg; PE: 190° C., 2.16 Kg |

EXAMPLE 1

A polyethylene sheet product is formed by extruding a high density polyethylene with a melt index of 0.6 g/10 min and a density of 0.96 g/cc. Extrusion conditions are summarized in Table 1.

A polypropylene sheet product is formed by extruding an isotactic polypropylene homopolymer having a melt index of 1.5 g/10 min and a density of 0.90 g/cc. Extrusion conditions are summarized in Table 1.

TABLE 1

Extrusion conditions

| | Polyethylene | Polypropylene |
|---|---|---|
| Die Temperature, °C. | 195 | 212 |
| Melt Temperature, °C. | 220 | 228 |
| Air ring height, inches | 0.75 | 2.25 |
| Take up speed, fpm | 80 | 80 |
| Draw down ratio | 90 to 1 | 82 to 1 |
| Blow up ratio | 1 | 1 |
| Air plenum pressure, inches of water | 3.5 | 2.5 |
| Weighted gauge, mil | 0.58 | 0.63 |
| Birefringence | 0.031 | 0.016 |

The sheet products are annealed in an oven under slight tension at a constant temperature for 10 minutes. The annealing temperature for polypropylene is 140° C. and for polyethylene, 115° C.

The annealed material is then subjected to a cold stretch at room temperature, followed by a hot stretch at elevated temperatures, and then by heat setting with relaxation of the film. Stretching conditions are summarized in Table 2. The stretched products are microporous films with the properties summarized in Table 3.

TABLE 2

Stretching Conditions

| | Polyethylene (PE) | Polypropylene (PP) |
|---|---|---|
| Cold Stretch, % | 30 | 50 |
| Hot Stretch, % | 200 | 150 |
| Hot Stretch Temperature, °C. | 115 | 140 |
| Relaxation, % | 50 | 50 |
| Relaxation Temperature, °C. | 120 | 140 |

The two ply stretched film is slit along the edges and deplied. Using four unwind stands, two plies of polyethylene and two plies of polypropylene are mounted in the sequence of polyethylene on the top, the two polypropylene plies, and a polyethylene ply on the bottom. The four plies are passed through the oven under slight tension at 130° C. with nips closed. Two polyethylene-polypropylene bilayers are produced after separating the polypropylene plies. Adhesion between the polyethylene and polypropylene is about 8 grams/cm (the peel strength, at these values, does not appear to be significantly dependent upon peel rate of 0.25 inch/min to 6 inch/min). The properties of the bilayer separator are summarized in Table 3.

TABLE 3

Stretched Microporous Film and Bilayer Properties

| | PE | PP | Bilayer |
|---|---|---|---|
| Gurley, sec-in$^2$ | 10 | 16 | 25 |
| Thickness, mil | 0.51 | 0.50 | 1.06 |
| Basis Weight, mg/cm$^2$ | 0.77 | 0.73 | |
| Porosity, % | 36 | 38 | |
| Machine direction shrinkage, % | 1 | 2 | 3 |
| Machine direction stress, kpsi | 24 | 25 | 25 |
| Machine direction elongation, % | 62 | 48 | 43 |
| Transverse direction stress, kpsi | 1.8 | 2.0 | 1.8 |
| Transverse direction elongation, % | 860 | 690 | 800 |
| Electrical resistance, mOhms-in$_2$ | 5 | 4 | 6 |
| Puncture strength, grams-mm | | | 2400 |

EXAMPLE 2

A polyethylene sheet product is formed by extruding a high density polyethylene with a melt index of 0.3 g/10 min and a density of 0.96 g/cc. Extrusion conditions are summarized in Table 4.

A polypropylene sheet product is formed by extruding an isotactic polypropylene homopolymer having a melt index of 1.5 g/10 min and a density of 0.90 g/cc. Extrusion conditions are summarized in Table 4.

TABLE 4

Extrusion conditions

| | PE | PP |
|---|---|---|
| Die Temperature, °C. | 180 | 210 |
| Melt Temperature, °C. | 204 | 224 |
| Air ring height, inches | 1.75 | 2.0 |
| Take up speed, fpm | 60 | 50 |
| Draw down ratio | 115 to 1 | 120 to 1 |
| Blow up ratio | 1 | 1 |
| Air plenum pressure, inches of water | 1.2 | 1.2 |
| Weighted gauge, mil | 0.61 | 0.57 |
| Birefringence | 0.035 | 0.016 |

The sheet products are annealed in an oven under slight tension at a constant temperature for 10 minutes. The annealing temperature for polypropylene is 140° C. and for polyethylene, 115° C. The annealing step increases the crystallinity of the sheet products.

The annealed material is then subjected to a cold stretch at room temperature, followed by a hot stretch at elevated temperatures, and then by heat setting with relaxation of the film. Stretching conditions are summarized in Table 5. The stretched products are microporous films with the properties summarized in Table 6.

TABLE 5

| | Stretching Conditions | |
| --- | --- | --- |
| | Polyethylene | Polypropylene |
| Cold Stretch, % | 45 | 25 |
| Hot Stretch, % | 150 | 140 |
| Hot Stretch Temperature, °C. | 115 | 140 |
| Relaxation, % | 50 | 50 |
| Relaxation Temperature, °C. | 115 | 140 |

The two ply stretched film is slit along the edges and deplied. Using four unwind stands, two plies of polyethylene and two plies of polypropylene are mounted in the sequence of polyethylene on the top, the two polypropylene plies, and a polyethylene ply on the bottom. The four plies are passed through the oven under slight tension at 130° C. with nips closed. Two polyethylene-polypropylene bilayers are produced after separating the polypropylene plies. Adhesion between the polyethylene and polypropylene is about 8 grams/cm (the peel strength, at these values, does not appear to be significantly dependent on peel rate OF 0.25 inch/min to 6 inch/min). The properties of the bilayer are summarized in Table 6.

TABLE 6

| Stretched Microporous Film and Bilayer Properties | | | |
| --- | --- | --- | --- |
| | Poly-ethylene | Poly-propylene | Bilayer |
| Gurley, sec-in² | 8 | 10 | 16 |
| Thickness, mil | 0.50 | 0.50 | 1.03 |
| Basis Weight, mg/cm² | 0.75 | 0.74 | |
| Porosity, % | 40 | 39 | |
| Puncture strength, grams-mm | | | 2060 |

The present invention maybe embodied in other specific forms without departing from the spirit or essential attributes thereof, and, accordingly, reference should be made to the appended claims, rather than to the foregoing specification, as indicating the scope of the invention.

We claim:

1. A shutdown, bilayer battery separator comprising:

a first microporous membrane having shutdown capability and having a face; and a second microporous membrane having strength capability and having a face; and said first membrane and said second membrane being joined together in face-to-face contact; and said separator having a thickness less than 3 mils; a puncture strength, as measured from said second microporous membrane, of greater than 1900 grams-millimeters; and a peel strength of greater than 1 gram/centimeter.

2. The separator according to claim 1 wherein said puncture strength is greater than 2000 grams-millimeter.

3. The separator according to claim 1 wherein said puncture strength is greater than or equal to 2400 grams-millimeter.

4. The separator according to claim 1 wherein said peel strength is greater than or equal to 4 grams/centimeter.

5. The separator according to claim 1 wherein said peel strength is greater than or equal to 8 grams/centimeter.

6. The separator according to claim 1 wherein said thickness ranges from about 0.9 mils to less than 3 mils.

7. The separator according to claim 1 wherein said first membrane's melting temperature is at least 20° C. less than said second membrane's melting temperature.

8. The separator according to claim 1 wherein said first membrane is made from a polyethylene material and said second membrane is made from a polypropylene material.

9. A battery comprising the separator set forth in claim 1.

10. A shutdown, bilayer battery separator comprising:

a polyethylene, microporous membrane having a face;

a polypropylene, microporous membrane having a face;

said polyethylene membrane and said polypropylene membrane being joined together in face-to-face contact; and said separator having a thickness less than 3 mils; a puncture strength, as measured from the polypropylene membrane, greater than or equal to 2400 gram-millimeter; and a peel strength greater than or equal to 8 grams/centimeter.

11. A battery comprising the separator set forth in claim 10.

* * * * *